United States Patent [19]
Hollins

[11] 3,760,236
[45] Sept. 18, 1973

[54] APPARATUS FOR AUTOMATICALLY EXTINGUISHING LIGHTS OF A VEHICLE

[76] Inventor: Jesse R. Hollins, 1 Chester Dr., Great Neck, N.Y. 11021

[22] Filed: Nov. 8, 1971

[21] Appl. No.: 196,274

[52] U.S. Cl. .................. 317/142 TD, 307/10 BP
[51] Int. Cl. ........................................ H01h 47/18
[58] Field of Search ............... 317/142 TD, 123, 317/141 R; 307/10 LS, 10 BP; 315/82, 83

[56] References Cited
UNITED STATES PATENTS

| | | | |
|---|---|---|---|
| 3,225,250 | 12/1965 | Hershberger | 307/10 BP |
| 2,751,507 | 6/1956 | Crum | 307/10 BP |
| 2,862,148 | 11/1958 | Weigl et al. | 307/10 BP |
| 3,686,506 | 8/1972 | Offner | 307/10 LS |
| 3,668,628 | 6/1972 | Barrow | 307/10 BP |

*Primary Examiner*—J. D. Miller
*Assistant Examiner*—Harry E. Moose, Jr.
*Attorney*—Morris Kirschstein et al.

[57] ABSTRACT

Apparatus for automatically extinguishing lights of a vehicle. The apparatus includes an ignition switch having "ON" and "OFF" contact terminals and at least one pole, a light control switch for turning the lights of the vehicle on and off, and a source of power coupled to the pole of the ignition switch and to the light control switch. Means are provided for automatically moving the light control switch to the "OFF" position for extinguishing the lights of the vehicle. There is also provided electric circuit means coupled to the "OFF" contact terminal of the ignition switch so that an electric current is supplied from the source of power through the "OFF" contact terminal of the ignition switch and to the electric circuit means for activating the automatic moving means when the pole of the ignition switch is electrically connected to the "OFF" contact terminal of the ignition switch.

5 Claims, 11 Drawing Figures

APPARATUS FOR AUTOMATICALLY EXTINGUISHING LIGHTS OF A VEHICLE

BACKGROUND OF THE INVENTION

1. Field of the Invention

This invention relates to an apparatus for automatically extinguishing lights of a vehicle, and more particularly to electric circuit means coupled to the "OFF" contact terminal of an ignition switch to activate means for automatically moving a light control switch to its "OFF" position for extinguishing the vehicular lights.

2. Description of the Prior Art

In present automotive vehicles, the headlights and parking lights, etc. are turned on and off manually by the operator of the vehicle. When driving at night, the operator of a vehicle will turn the vehicular lights on. However, upon leaving the vehicle, especially if the vehicle is parked in a heavily illuminated area such as a city street or a whether he center, the driver will often forget to extinguish the headlights. If the driver is operating a vehicle in the early morning hours while it is still dark, he will have his headlights turned on but may tend to forget to extinguish the lights upon leaving the vehicle after the sun has risen. Furthermore, the vehicular lights are often turned on during daylight hours when there is inclement weather, such as fog, heavy rain or snow storms, and again the driver may tend to forget to extinguish the vehicular lights upon leaving the vehicle.

Leaving the vehicular lights on over an extended period of time when the motor is off results in the discharge of the battery. If the discharge of the battery continues over too long a period of time, the battery will not have sufficient electric energy to crank the engine. Oftentimes the driver will park his vehicle and will not remember whethr he had extinguished the lights and he will return to his parked vehicle to check to see if the lights actually had been turned off. It is sometimes inconvenient for him to make this type of a checkup trip, especially during the cold winter months. In cold weather, the cranking of the vehicle requires more electric energy, thus requiring a more highly charged battery than in warm summer months. It is thus especially important during the winter that the vehicular lights not be left on for any prolonged period of time when the engine is not running.

The vehicular accessory equipment, such as electric windshield wiper motor, heater and fan motors, exhaust motor, radio, air-conditioning unit, etc., are all connected to the "ON" terminal or the accessory terminal of the ignition switch, wherein all these accessories cannot operate when the ignition switch is in the "OFF" position. Therefore, none of these accessories will operate when the ignition key is removed from the ignition switch and the vehicle is parked. It is impractical to connect the vehicular lights to the "ON" or accessory positions of the ignition switch since the load is too heavy for the ignition switch to carry. Furthermore, there may often be times when the driver of a vehicle will wish to operate some or all of his vehicular lights when the car is parked and the engine is not running, thus the vehicular light switch is directly electrically connected to the battery of the vehicle.

SUMMARY OF THE INVENTION

1. Purpose of the Invention

It is an object of this invention to provide an apparatus for automatically extinguishing the lights of a vehicle after the vehicle is parked and the engine is no longer running.

It is a further object of this invention to provide an apparatus for automatically extinguishing the lights of a vehicle, which apparatus is electrically activated when the ignition switch of the vehicle is in the "OFF" position.

Other objects of the invention will in part be obvious and in part be pointed out hereinafter.

2. Brief Description of the Invention

According to a broad aspect of the invention, there is provided an apparatus for automatically extinguishing lights of a vehicle comprising an ignition switch having "ON" and "OFF" contact terminals and at least one pole; a light control switch for turning the lights of the vehicle on and off; a source of power coupled to said one pole of said ignition switch and to said light control switch; means for automatically moving said light control switch to an "OFF" position for extinguishing the lights; and electric circuit means coupled to the "OFF" contact terminal of said ignition switch, whereby an electric current is supplied from said source of power through said ignition switch when said one pole is electrically connected to the "OFF" contact terminal of said ignition switch, and to said electric circuit means for activating said automatic moving means.

BRIEF DESCRIPTION OF THE DRAWINGS

In the accompanying drawings in which are shown various possible embodiments of my invention.

DESCRIPTION OF THE PREFERRED EMBODIMENTS

Figure 1:
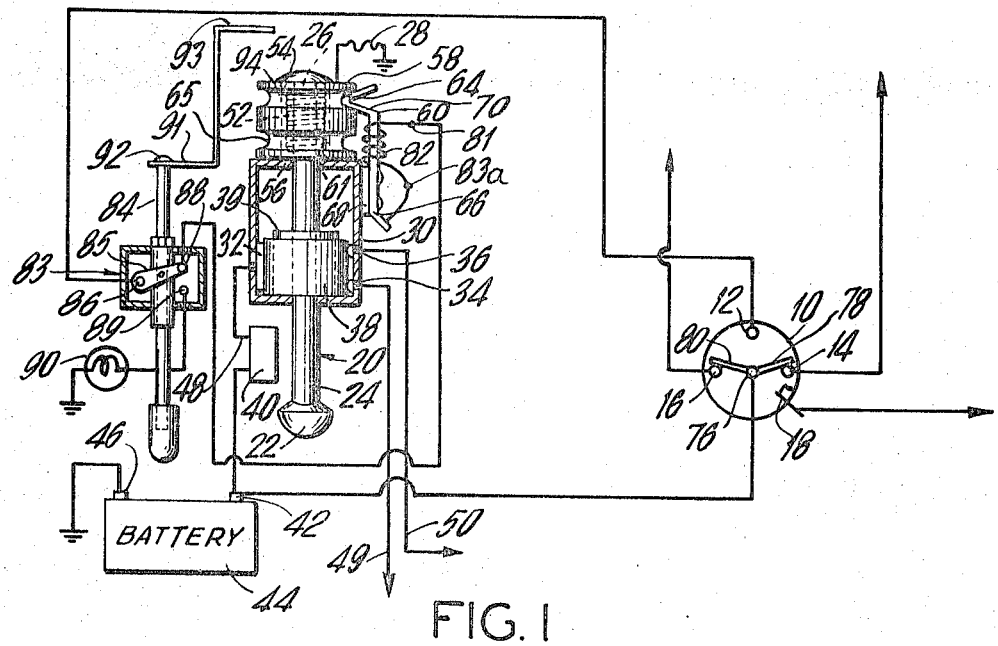
FIG. 1 is a plan view of one embodiment of the invention wherein the light control switch is so positioned as to have all the vehicular lights on, and there is included a switch for disenabling the automatic lights extinguishing mechanism.

One embodiment of the apparatus for automatically extinguishing the lights of a vehicle is shown in FIG. 1.

A ignition switch 10 is shown having an "OFF" contact terminal 12, an "ON" contact terminal 14 connected to the ignition system of the engine, an accessory contact terminal 16 for energizing the accessories such as the radio, windshield wiper motor, fan motor, etc., and contact terminal 18 connected to a solenoid for cranking the motor of the vehicle.

Figure 2:
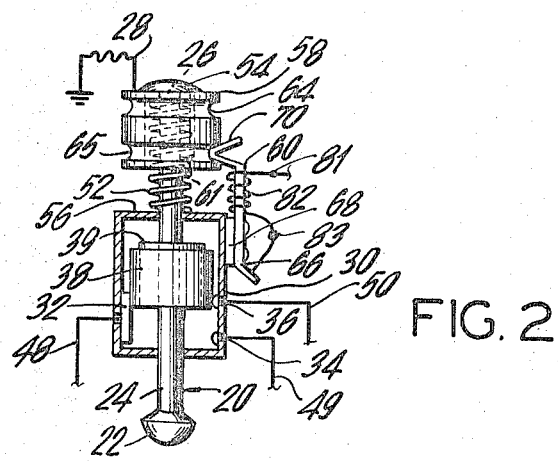
FIG. 2 is a fragmentary view of the light control switch (shown in FIG. 1) wherein the light control switch is so positioned as to have all the vehicular lights on, except for the headlights.

A light control switch 20 is also shown having a knob 22 connected to a shaft 24. In this instance the shaft can be made of electrically conductive material and its end 26 opposite knob 22 can have a flexible lead 28 connected to circuit ground. Shaft 20 can move within a housing 30. Interior to housing 30, a hot terminal 32 can be insulatedly mounted thereon and a respective first and second terminal 34 and 36 can also be insulatedly mounted to the interior of housing 30. An electrically conductive member 38 can be insulatedly attached to shaft 20 via insulating bushing 39, and member 38 can be so dimensioned as to make electrical contact between hot terminal 32 and first and second terminals 34 and 36. First terminal 34 is connected to the vehicular headlights and second terminal 36 is connected to the remaining lights of the vehicle, such as tail lights, parking lights, instrument panel lights, etc. Hot terminal 32 is electrically connected through an overload circuit breaker 40 to one terminal 42 of a source of power such as battery 44. The other terminal 46 of battery 44 is electrically connected to circuit ground. It should be noted that electrical lead wire 48 connected to hot terminal 32, electrical lead wire 49 connected to first terminal 34, and electrical lead wire 50 connected to second terminal 36, are all insulated from housing 30 since housing 30 can be grounded. It also should be noted that light control switch 20 is a two-position switch only in the sense that when it is positioned to make electrical contact between hot terminal 32 and both first and second terminals 34 and 36 (as shown in FIG. 1) all of the vehicular lights are turned on, and when light control switch 20 is so positioned (as shown in FIG. 2) that hot terminal 32 will only be electrically connected to second terminal 36, all of the vehicular lights except for the headlights will be turned on. It should also be noted that light control switch 20 can be manually operated to turn some or all the lights on and to turn all of the lights off.

In the embodiment shown in FIG. 1, shaft 20 is spring loaded by a compression spring 52 located between head 54 of shaft 24 and side 56 of housing 30. In this manner, compression spring 52 will tend to electrically connect housing 30 to circuit ground. Also compression spring 54 will be trying to move shaft 24 a sufficient distance so that electrically conducting member 38 no longer makes electrical contact between hot terminal 32 and first and second terminals 34 and 36 (as shown in FIG. 3).

Figure 3:
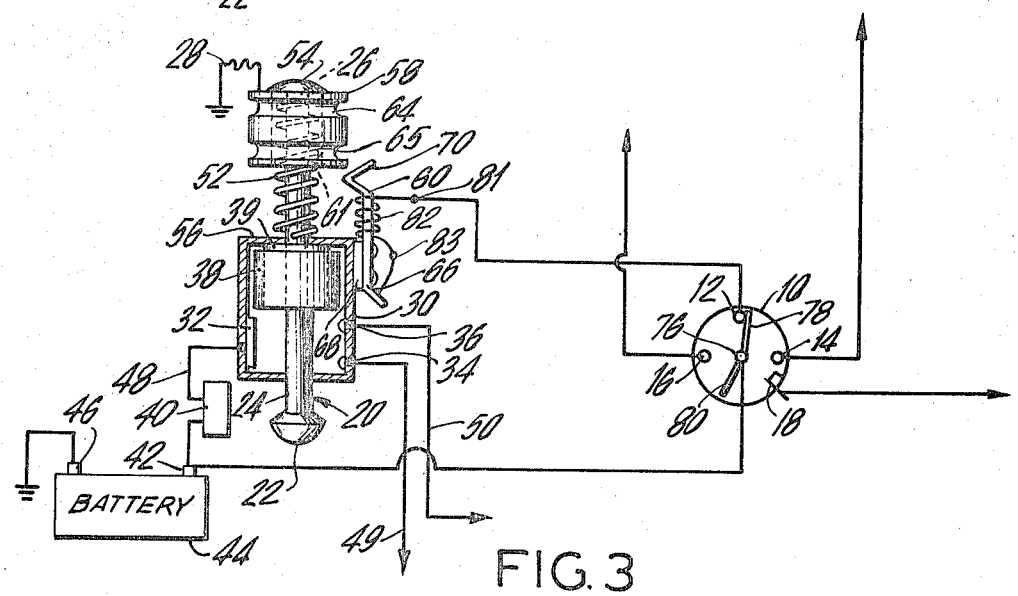
FIG. 3 is a plan view of the embodiment shown in FIG. 1 after the automatic extinguishing mechanism has been activated, wherein the disenabling switch is omitted.

In order to prevent compression spring 52 from always automatically placing shaft 24 in such a position as to turn all the vehicular lights off (as shown in FIG. 3), means for holding light control switch 20 in either of the first or second "ON" positions is provided. This holding means includes a latch-receiving member 58 and an arm-latching member 60. Latch-receiving member 58 has a channel 61 for housing at least a portion of compression spring 52 and a portion of shaft 24, wherein one end 62 of compression spring 52 is fastened to a closed end 63 of channel 61. Latch-receiving member 58 is fastened to shaft 24 adjacent head 54 of shaft 24. Latch-receiving member 58 can have first and second respective recesses 64 and 65 formed within an outer portion thereof. Recesses 64 and 65 in this example are circular grooves. Arm-latching member 60 can have one end 66 fastened to housing 30, but electrically insulated therefrom by insulating member 68 which is positioned between housing 30 and arm-latching member 60. The other end of arm-latching member 60 has a protruding portion 70 which is resiliently movable in a direction radial to the axis of shaft 24. Protruding portion 70 is so shaped as to extend within either of recesses 64 and 65 in latch-receiving member 58 so as to physically engage latch-receiving member 58, and hold latch-receiving member 58 and shaft 24 stationary whenever protruding portion 70 is placed in either recess 64 or 65. When protruding portion 70 of arm-latching member 60 is placed within recess 64, light control switch 20 is placed in a first "ON" position and all the vehicular lights are turned on, and when protruding portion 70 of arm-latching member 60 is placed within recess 65 of latch-receiving member 58, light control switch 20 is placed in a second "ON" position and all of the vehicular lights, except for the headlights, are turned on.

When protruding portion 70 of arm-latching member 60 is placed within either of recesses 64 and 65 of latch-receiving member 58, there is provided sufficient force to overcome the force of compression spring 52. The above described holding means does not prevent the operator of the vehicle from manually moving the light control switch to either of the first and second "ON" positions or the "OFF" position. The means for automatically moving the light control switch to the "OFF" position for extinguishing the lights is provided by the force exerted by compression spring 52.

Electric circuit means for activating the automatic moving means and for allowing compression spring 52 to move light control switch 20 to the "OFF" position is provided as follows. Terminal 42 of battery 44 is electrically connected to center tap terminal 76 of ignition switch 10. Poles 78 and 80 are also electrically connected to center tap terminal 76. As shown in FIG. 1, pole 78 is in electrical contact with contact terminal 14 for supplying power to the ignition system and pole 80 is electrically connected to contact terminal 16 for supplying power to the vehicular accessories. Now (as shown in FIG. 3) when the ignition switch is turned to the "OFF" position, pole 78 is electrically connected to the "OFF" contact terminal 12 so as to supply power to the electric circuit means for activating the automatic moving means. Even though the "OFF" contact terminal of the ignition switch will carry electric current, we will still refer to this contact terminal as the "OFF" contact terminal since the engine will be off when the ignition key is placed in the "OFF" position. The "OFF" contact terminal 12 is electrically coupled to one end 81 of heater coil 82, which heater coil surrounds a movable arm of a bi-metallic member. This movable arm of the bi-metallic member is the same as the previously referred to arm-latching member 60.

The other end 83a of heater coil 82 is electrically connected to arm-latching member 60. Therefore (as shown in FIG. 3) when the ignition switch is in the "OFF" position and pole 78 is electrically connected to the "OFF" contact terminal 12, current will pass through heater coil 82 to arm-latching member 60 through latch-receiving member 58 and shaft 24 to circuit ground when the protruding portion 70 of arm-latching member 60 is placed within either of recesses 64 and 65 (as shown in FIGS. 1 and 2) and engages latch-receiving member 58. It should of course be noted that arm-latching member 60, latch-receiving member 58 and shaft 24 are electrically conductive to provide a good low resistance path to circuit ground. As current passes through heater coil 82, it begins to heat up and thereby heats up arm-latching member 60. As arm-latching member 60 heats up and since it is a bi-metallic member, the protruding portion 70 of arm-latching member 60 begins to move out of the recess in latch-receiving member 58 until the holding force of latch-receiving member 58 and arm-latching member 60 becomes less than the force exerted by compression spring 52, whereupon compression spring 52 causes shaft 24 of light control switch 20 to move in such a manner and for such a distance that its electrical conducting member 58 no longer electrically contacts hot terminal 32 and first and second terminals 34 and 36 (as shown in FIG. 3). As also shown in FIG. 3, arm-latching member 60 no longer electrically contacts any part of latch-receiving member 58, thereby causing the electric current, which has been flowing through heater coil 82, to cease to flow so as not to discharge or drain battery 44. Since current no longer flows through heater coil 82, arm-latching member 60 will cool off and return to its original position. It should be noted that in the embodiment shown in FIG. 3, one end 81 of coil 82 is directly electrically connected to "OFF" contact terminal 12 and under these circumstances, whenever the ignition key is in the "OFF" position, the automatic extinguishing circuit will be activated whenever the lights are turned on.

Since there may be occasions when the operator of the vehicle would want to have some of the vehicular lights on for an extended period of time while the ignition key is off, a disenabling switch 83 (shown in FIG. 1) can be connected between end 81 of coil 82 and "OFF" contact terminal 12 of ignition switch 10. This disenabling switch 83 can be a make and break type switch having a movable rod 84 and an electrically connecting arm member 85 insulatedly mounted onto rod 84. One end 86 of connecting arm 85 is electrically connected to "OFF" contact terminal 12. The other end 87 of connecting arm 85 is in electrical contact with a make contact terminal 88, and is electrically connected to end 81 of heater coil 82 when rod 84 of disenabling switch 83 is depressed and in the make position. The other end 87 of connecting arm 85 electrically contacts break contact terminal 89 and is electrically connected to a pilot light 90 when rod 84 of disenabling switch 83 is pulled out and in the break position. Thus when disenabling switch 83 is in the break position, the electrical connection between heater coil 82 and the "OFF" contact terminal 12 of ignition switch 10 is interrupted, thereby disenabling the automatic light extinguishing mechanism while at the same time supplying power to pilot light 90, so that pilot light 90 will be lit, thus warning the operator of the vehicle that the automatic light extinguishing mechanism has been disabled. Pilot light 90 can be designed as an integral part of disenabling switch 83, or may be omitted if desired.

Disenabling switch 83 also contains interlocking means for preventing disenabling switch 83 from being placed in the break position when light control switch 20 is in the "OFF" position, and for returning disenabling switch 83 to the make position (if it were previously in the break position) when light control switch 20 is being manually positioned to turn off all the vehicular lights. Thus the interlocking means will only allow disenabling switch 83 to be placed in the break position when light control switch 20 has first been placed in one of the two "ON" positions. The interlocking means can be provided by an extending member 91 attached to end 92 of rod 84. Member 91 has a flanged portion 93 extending over and adjacent to the top 94 of latch-receiving member 58.

It should also be noted that in the above embodiments, the automatic extinguishing of the lights will occur within a reasonable time delay after the ignition switch has been turned to the "off" position. This time delay is determined by the amount of current which flows through the heater coil, the resistance of heater coil, the number of turns of the heater coil, and the responsiveness of the bi-metallic arm-latching member 60 to increases in temperature. Therefore it should be noted that by simply changing the number of turns of the heater coil which surrounds arm-latching member 60, the time delay in automatically extinguishing the lights can be changed. A convenient time delay could range from approximately 60 to 90 seconds and could vary therefrom in accordance with design requirements.

Figure 4:
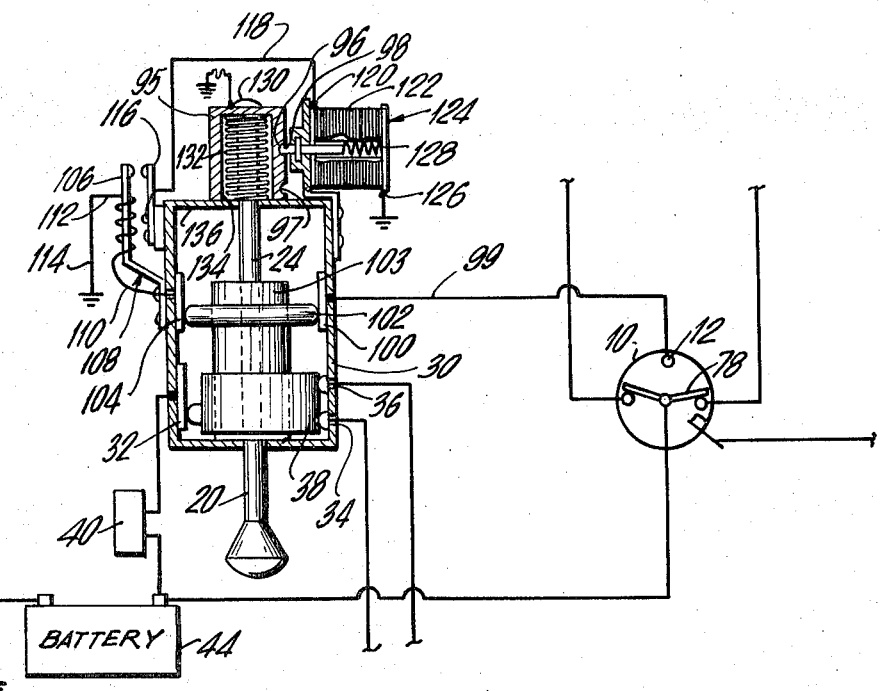
FIG. 4 is a plan view of another embodiment of the invention wherein a solenoid is used to hold the light control switch in position.

Another embodiment of the invention is shown in FIG. 4. In this embodiment similar means for holding the light control switch 20 stationary in either of the first or second "ON" positions is provided by another latch-receiving member 95, having recesses 96 and 97 within a surface portion thereof, and a spring loaded pin 98 which will fit into either recess 96 or 97. Electric circuit means are again coupled to the "OFF" contact terminal 12 of ignition switch 10 via conducting wire 98 which is connected to a first terminal member 100, which first terminal member is insulatedly mounted to the interior of housing 30. It again should be noted that conducting wire 99 is electrically insulated from housing 30 since housing 30 may be grounded. The electric circuit means also includes an additional electrically conductive member 102 which is insulatedly attached to shaft 24 via insulating bushing 103 since shaft 24 is or can be grounded. Electrically conductive member 102 extends within housing 30 so as to electrically contact first terminal member 100 to a second terminal member 104, which second terminal member is also insulatedly mounted to the interior of housing 30. Terminal member 104 is electrically connected to a movable arm 106 of a bi-metallic switch 108. A heater coil 110 is placed around movable arm 106 and one end 112 of heater coil 110 is electrically connected to circuit ground, while the other end 114 of heater coil 110 is electrically connected to the movable arm 106 of bi-metallic switch 108. Bi-metallic switch 108 has a fixed arm 116 which is electrically connected via conducting wire 118 to one end 120 of a winding 122 of a solenoid 124. The other end 126 of winding 122 is electrically connected to circuit ground. Spring loaded pin 98 actually is the solenoid plunger for solenoid 124 and will withdraw into open core area 128 of solenoid 124 when sufficient current passes through winding 122 of solenoid 124. It should be noted that latch-receiving member 95 is mechanically and electrically connected to the end 130 of shaft 24, and the automatic moving means is again provided by a compression spring 132 which has one end thereof placed within a chamber 134 in latch-receiving member 95. Compression spring 132 at least partially surrounds shaft 24, and the other end of compression spring 132 is either attached to or is pressed against side 136 of housing 30.

Again, when pole 78 of ignition switch 10 is not electrically connected to "OFF" contact terminal 12, no current will flow through heater coil 110 when light control switch 20 is in either of the first or second "ON" positions, and bi-metallic switch 108 will be open so that movable arm 106 does not electrically contact fixed arm 116. When pole 78 of ignition switch 10 is electrically connected to "OFF" contact terminal 12, current flows through conducting wire 99, terminal member 100, electrically conductive member 102, terminal member 104 and heater coil 110 to circuit ground. As heater coil 110 heats up, transferring its heat to movable bi-metallic arm 106, movable arm 106 begins to move towards fixed arm 116 until electrical contact is made between movable 106 and fixed arm 116, thereby closing bi-metallic switch 108. Once bi-metallic switch 108 closes, electric current then flows through movable arm 106, fixed arm 116, conductor 118 and through winding 122 to circuit ground, so as to energize solenoid 124, whereupon spring loaded pin 98 retracts into open core area 128. The moment the holding force between pin 98 and latch-receiving member 95 becomes less than the force of compression spring 132, shaft 24 moves a sufficient distance so that electrically conductive member 38 no longer makes electrical contact between hot terminal 32 and first and second terminals 34 and 36, thereby extinguishing all of the vehicular lights which were electrically connected to terminals 34 and 36. Also, after compression spring 132 has forced shaft 24 to move a sufficient distance to extinguish the vehicular lights, electrically conductive member 102 no longer makes electrical contact between terminal member 100 and terminal member 104 so that current no longer flows through heater coil 112 and solenoid winding 122 to circuit ground so as to ensure that battery 44 will not discharge when the ignition switch is in the "OFF" position.

Figure 5:
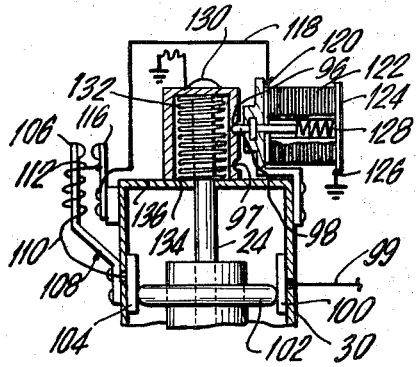
FIG. 5 is a fragmentary view of FIG. 4 showing a heater coil winding electrically connected in series with a winding of the solenoid.

In the alternate embodiment shown in FIG. 5, end 112 of heater coil 110 is electrically connected to fixed arm 116 via conductive wire 138 so that heater coil 110 is electrically connected in series with solenoid winding 122 when bi-metallic switch 108 is open. Now, when ignition switch 10 is turned to the "OFF" position, electric current flows in series through heater coil 110 and solenoid winding 122 to circuit ground. Since heater coil 110 generally has a relatively high resistance, the current flowing through solenoid winding 122 is not great enough to activate the solenoid, although the passing current is sufficient to heat up heater coil 110 and to transfer its heat to movable arm 106. Once bi-metallic switch 108 closes, heater coil 110 is shunted and more current flows directly through solenoid winding 122, so as to activate solenoid 124 and retract pin 98, thereby activating the previously described automatic extinguishing means so that current will cease to flow to the vehicular lights and to heater coil 110 and solenoid winding 122, thereby preventing the discharge of battery 44. Again, once current ceases to flow through heater coil 110, movable arm 106 cools returning the bi-metallic switch 108 to its open circuit position.

Figure 8:
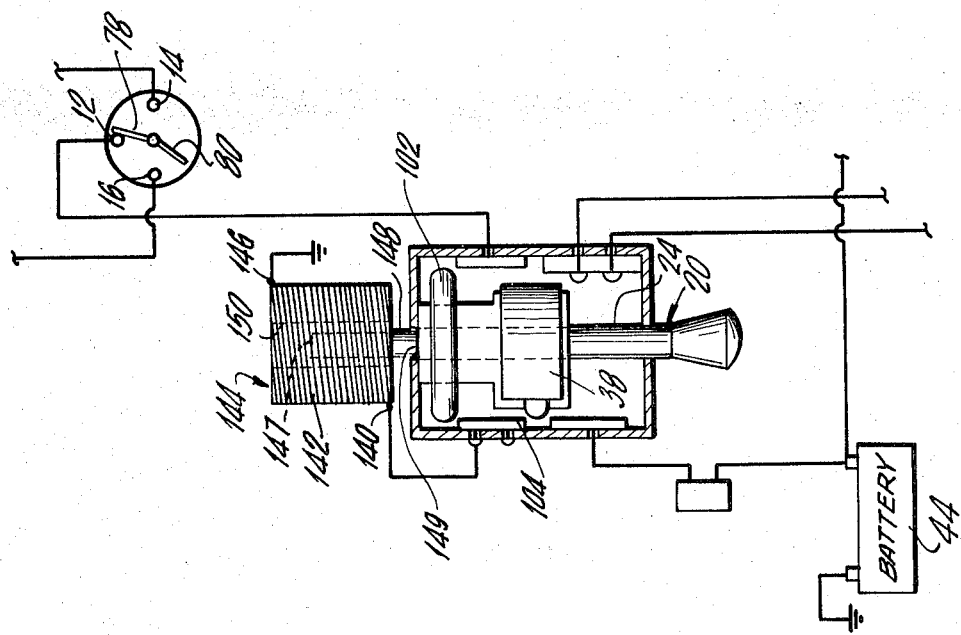
FIG. 8 is a plan view of the embodiment shown in FIG. 6 after the automatic extinguishing mechanism has been activated.
Figure 6:
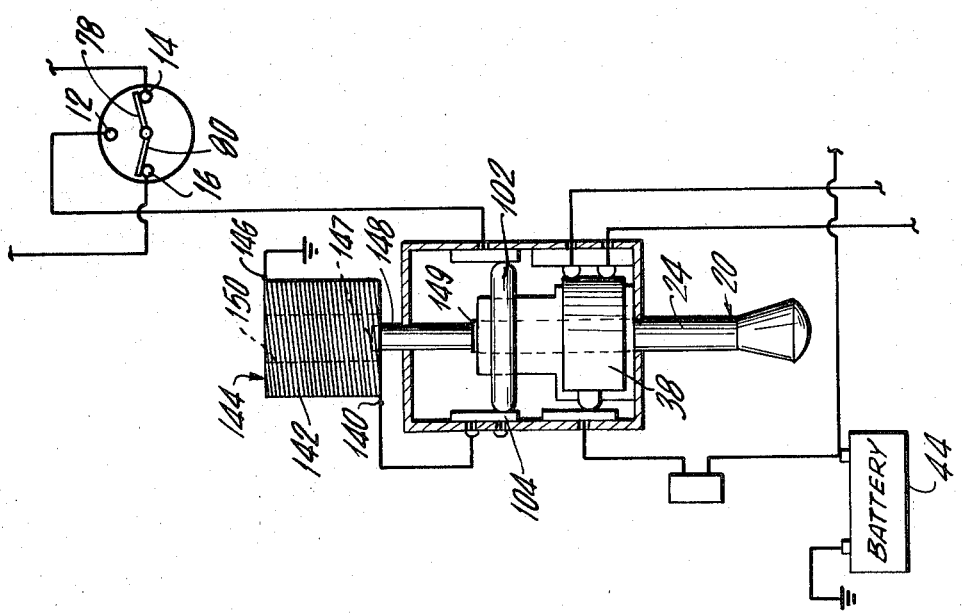
FIG. 6 is another embodiment of the invention wherein the light control switch is so positioned as to have all the vehicular lights on, and a solenoid provides the force to extinguish the lights.

FIG. 6 shows a still further embodiment of the invention wherein second terminal member 104 is directly electrically connected to one end 140 of a winding 142 of a solenoid 144, wherein the other end 146 of winding 142 is electrically connected to circuit ground. In this embodiment one end 147 of a solenoid plunger 148 fits partially within a clear open core area 150 of solenoid 144. The other end 149 of solenoid plunger 148 is attached to and extends axially from shaft 24. Now, when light control switch is in either of the first or second "ON" position and the ignition switch is turned to the "OFF" position, electric current flows immediately through winding 142 so as to cause plunger 148 to move into the open core area 150, so that respective electric contact members 38 and 102 are now so positioned (as shown in FIG. 8) that electric current ceases to flow to the vehicular lights and solenoid winding 142, thereby preventing the discharge of battery 44.

Figure 7:
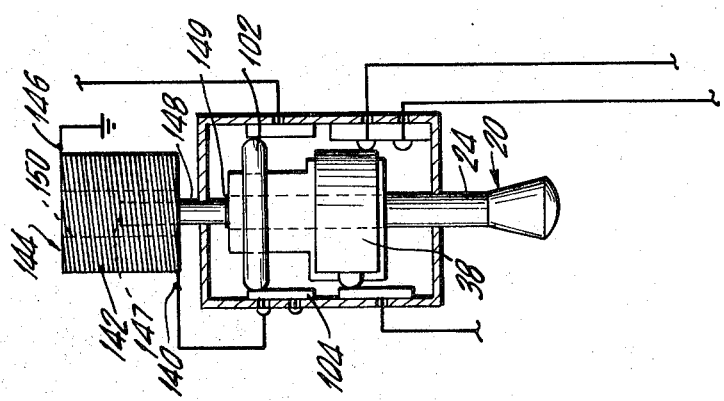
FIG. 7 is a fragmentary view of FIG. 6 wherein the light control switch is so positioned as to have all the vehicular lights on, except for the headlights.

While FIG. 6 shows light control switch 20 in the first "ON" position and plunger 148 slightly extending into open core area 150 of solenoid 144, FIG. 7 shows light control switch 20 in the second contact position wherein solenoid plunger 148 extends further into open core area 150 of solenoid 144.

Figure 9:
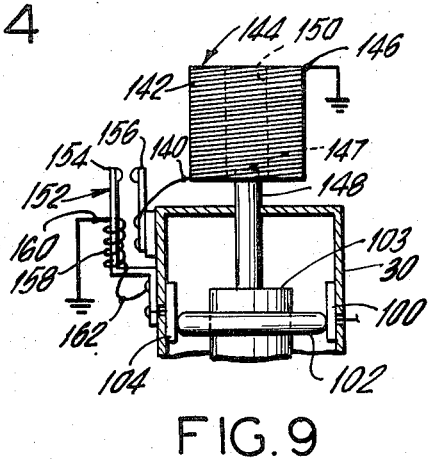
FIG. 9 is a fragmentary view of FIG. 6 showing a bimetallic switch connected in series with the solenoid.

In the embodiment shown in FIG. 6 the lights will be automatically extinguished almost immediately following the turning of the ignition switch to the "OFF" position. The immediate extinguishment of the lights described above can be delayed by placing a bi-metallic switch 152 in series with solenoid 144, as shown in FIG. 9. In this embodiment shown in FIG. 9, bi-metallic switch 152 has a movable arm 154 and a fixed arm 156, wherein both arms are insulatedly mounted to the exterior of housing 30, and fixed arm 156 is electrically connected to end 140 of winding 142 of solenoid 144. A heater coil 158 surrounds movable arm 154 wherein one end thereof 160 is electrically connected to circuit ground, and the other end thereof 162 is electrically connected to movable arm 154. When the ignition switch is turned to the "OFF" position, electric current flows through heater coil 158 so as to close bi-metallic switch at a delayed time. Once bi-metallic switch 158 closes, electric current then directly passes through bi-metallic switch 152 and solenoid winding 142, whereupon the extinguishing mechanism operates as described above with respect to FIG. 6.

Figure 10:
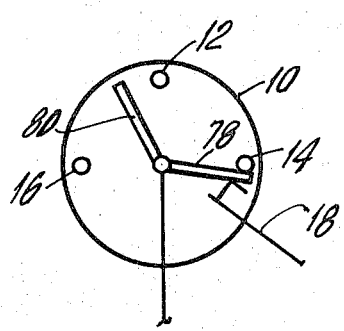
FIG. 10 is a plan view of the ignition switch when the engine and motor cranking mechanism are electrically activated.
Figure 11:
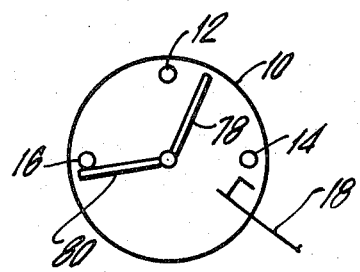
FIG. 11 is a plan view of the ignition switch when only the accessories are electrically activated.

It should be noted that poles 78 and 80 and contact terminals 12, 14, 16 and 18 of ignition switch 10 are so designed and relatively positioned that when pole 78 is electrically connected to contact terminal 14, pole 80 is electrically connected to contact terminal 16 (as shown in FIG. 1) wherein contact terminal 14 is electrically connected to the ignition system and contact terminal 16 is electrically connected to the vehicle's accessories; when pole 78 is electrically connected to contact terminal 12 (as shown in FIG. 3), the ignition switch is in the "OFF" position and pole 80 is not electrically connected to any of the other contact terminals; when pole 78 is electrically connected to both the ignition system contact terminal 14 and motor cranking contact terminal 18, pole 80 becomes disconnected from accessory contact terminal 16 (as shown in FIG. 10); and finally as shown in FIG. 11, when pole 80 is electrically connected to accessory contact terminal 16, pole 78 is electrically disconnected from the ignition system contact terminal 14, motor cranking contact terminal 18, and "OFF" position contact terminal 12.

It should be noted that the means for holding light control switch in either of the first or second "ON" positions or the "OFF" position is not shown in FIGS. 6 through 9.

It is to be understood that the above invention is not limited in its application solely to automative vehicles.

It is thus seem that there is provided an apparatus for automatically extinguishing vehicular lights which achieves the several objects of the invention and is well adapted to meet the conditions of practical use.

As various possible embodiments might be made of the above invention, and as various changes might be made in the embodiments set forth above, it is to be understood that all matter herein described, or shown in the accompanying drawings, is to be interpreted as illustrative and not in a limiting sense.

Having thus described the invention, there is claimed as new and is desired to be secured by Letters Patent:

1. Apparatus for controlling the automatic extinguishing of vehicular headlights comprising an ignition switch having "ON" and "OFF" contact terminals and at least one pole, a light control switch for turning the lights of a vehicle on and off and having an "ON" and "OFF" position, a source of power coupled to said one pole of said ignition switch and to said light control switch, means for automatically moving said light control switch to an "OFF" position for extinguishing the lights, electric circuit means coupled to the "OFF" contact terminal of said ignition switch for activating said automatic moving means, said electric circuit means including a disabling switch having an open condition and closed condition whereby when said disabling switch is in its closed condition electric current is supplied from said source of power through said ignition switch when said one pole is electrically connected to the "OFF" contact terminal of said ignition switch and through said electric circuit means for activating said automatic moving means to automatically extinguish the lights and when said disabling switch is in its open condition said automatic moving means is inactive when said one pole is electrically connected to the "OFF" contact terminal of said ignition switch so that the lights remain on even though the ignition switch is in the "OFF" position.

2. Apparatus according to claim 1 wherein means is provided for automatically closing the disabling switch when said disabling switch is in its open condition as said light control switch is moved to its "OFF" position.

3. Apparatus according to claim 1 further including a signal indicating means, and means for connecting said signal indicating means to said source of power when said disabling switch is in its open condition.

4. Apparatus according to claim 2 wherein said means for automatically closing said disabling switch as said light control switch is moved to its "OFF" position includes means which controls the opening and closing of said disabling switch, a member movable with said light control switch, said control means having a first position wherein said disabling switch is closed, and said member moving said control means to its first position if said control means is out of its first position as said light control switch is moved to its "OFF" position.

5. Apparatus according to claim 1 further including means for controlling the opening and closing of said disabling switch, said control means having a first position wherein said disabling switch is maintained in its closed condition and means maintaining said control means in its first position when said light control switch is in its "OFF" position.

* * * * *